United States Patent
Schwenke et al.

(10) Patent No.: US 8,248,023 B2
(45) Date of Patent: Aug. 21, 2012

(54) METHOD OF EXTERNALLY CHARGING A POWERTRAIN

(75) Inventors: R. Travis Schwenke, Springboro, OH (US); Nicholas Kokotovich, Troy, MI (US); Aniket Kothari, Southfield, MI (US); Mario V. Maiorana, Jr., Davisburg, MI (US); William R. Cawthorne, Milford, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 792 days.

(21) Appl. No.: 12/254,521

(22) Filed: Oct. 20, 2008

(65) Prior Publication Data
US 2009/0115377 A1 May 7, 2009

Related U.S. Application Data

(60) Provisional application No. 60/985,273, filed on Nov. 4, 2007.

(51) Int. Cl.
*H02J 7/14* (2006.01)
(52) U.S. Cl. ........ 320/104; 320/105; 320/134; 320/135; 320/136; 320/162; 361/90; 361/91.1
(58) Field of Classification Search .......... 320/134–136, 320/162; 361/90, 91.1
See application file for complete search history.

(56) References Cited

U.S. PATENT DOCUMENTS

| | | | |
|---|---|---|---|
| 5,488,283 A | 1/1996 | Dougherty et al. | |
| 5,717,310 A * | 2/1998 | Sakai et al. | 307/10.1 |
| 6,590,396 B1 * | 7/2003 | Zur et al. | 324/433 |
| 6,791,295 B1 * | 9/2004 | Berels | 320/103 |
| 6,832,148 B1 | 12/2004 | Bennett | |
| 6,868,318 B1 | 3/2005 | Cawthorne | |
| 7,154,236 B1 | 12/2006 | Heap | |
| 7,714,531 B2 * | 5/2010 | Kuranuki et al. | 320/101 |
| 2003/0189418 A1 * | 10/2003 | Schinner | 320/136 |
| 2004/0164706 A1 * | 8/2004 | Osborne | 320/116 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |

(Continued)

*Primary Examiner* — Jermele M Hollington
*Assistant Examiner* — Son Le (57) ABSTRACT

A method of externally charging a powertrain includes monitoring a voltage level of a first battery, determining when the monitored voltage level is below a first voltage threshold, and when the monitored voltage level is below the first voltage threshold, charging the first battery by supplying power from an external power source and increasing voltage of the power supplied by the external power source within the powertrain.

19 Claims, 3 Drawing Sheets

U.S. PATENT DOCUMENTS

| | | |
|---|---|---|
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0028179 A1* | 2/2006 | Yudahira et al. .............. 320/133 |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap et al. |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh et al. |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |

| | | | | | | |
|---|---|---|---|---|---|---|
| 2009/0118934 A1 | 5/2009 | Heap | | 2009/0118949 A1 | 5/2009 | Heap |
| 2009/0118935 A1 | 5/2009 | Heap | | 2009/0118950 A1 | 5/2009 | Heap |
| 2009/0118936 A1 | 5/2009 | Heap | | 2009/0118951 A1 | 5/2009 | Heap |
| 2009/0118937 A1 | 5/2009 | Heap | | 2009/0118952 A1 | 5/2009 | Heap |
| 2009/0118938 A1 | 5/2009 | Heap | | 2009/0118954 A1 | 5/2009 | Wu |
| 2009/0118939 A1 | 5/2009 | Heap | | 2009/0118957 A1 | 5/2009 | Heap |
| 2009/0118940 A1 | 5/2009 | Heap | | 2009/0118962 A1 | 5/2009 | Heap |
| 2009/0118941 A1 | 5/2009 | Heap | | 2009/0118963 A1 | 5/2009 | Heap |
| 2009/0118942 A1 | 5/2009 | Hsieh | | 2009/0118964 A1 | 5/2009 | Snyder |
| 2009/0118943 A1 | 5/2009 | Heap | | 2009/0118969 A1 | 5/2009 | Heap |
| 2009/0118944 A1 | 5/2009 | Heap | | 2009/0118971 A1 | 5/2009 | Heap |
| 2009/0118945 A1 | 5/2009 | Heap | | 2009/0118999 A1 | 5/2009 | Heap |
| 2009/0118946 A1 | 5/2009 | Heap | | 2009/0144002 A1 | 6/2009 | Zettel |
| 2009/0118947 A1 | 5/2009 | Heap | | | | |
| 2009/0118948 A1 | 5/2009 | Heap | | | | |

* cited by examiner

METHOD OF EXTERNALLY CHARGING A POWERTRAIN

CROSS REFERENCE TO RELATED APPLICATIONS

This application claims the benefit of U.S. Provisional Application No. 60/985,273 filed on Nov. 4, 2007, which is hereby incorporated herein by reference.

TECHNICAL FIELD

This disclosure is related battery monitoring systems.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method of externally charging a powertrain includes monitoring a voltage level of a first battery, determining when the monitored voltage level is below a first voltage threshold, and when the monitored voltage level is below the first voltage threshold, charging the first battery by supplying power from an external power source and increasing voltage of the power supplied by the external power source within the powertrain.

BRIEF DESCRIPTION OF THE DRAWINGS

One or more embodiments will now be described, by way of example, with reference to the accompanying drawings, in which.

DETAILED DESCRIPTION

Figure 1:
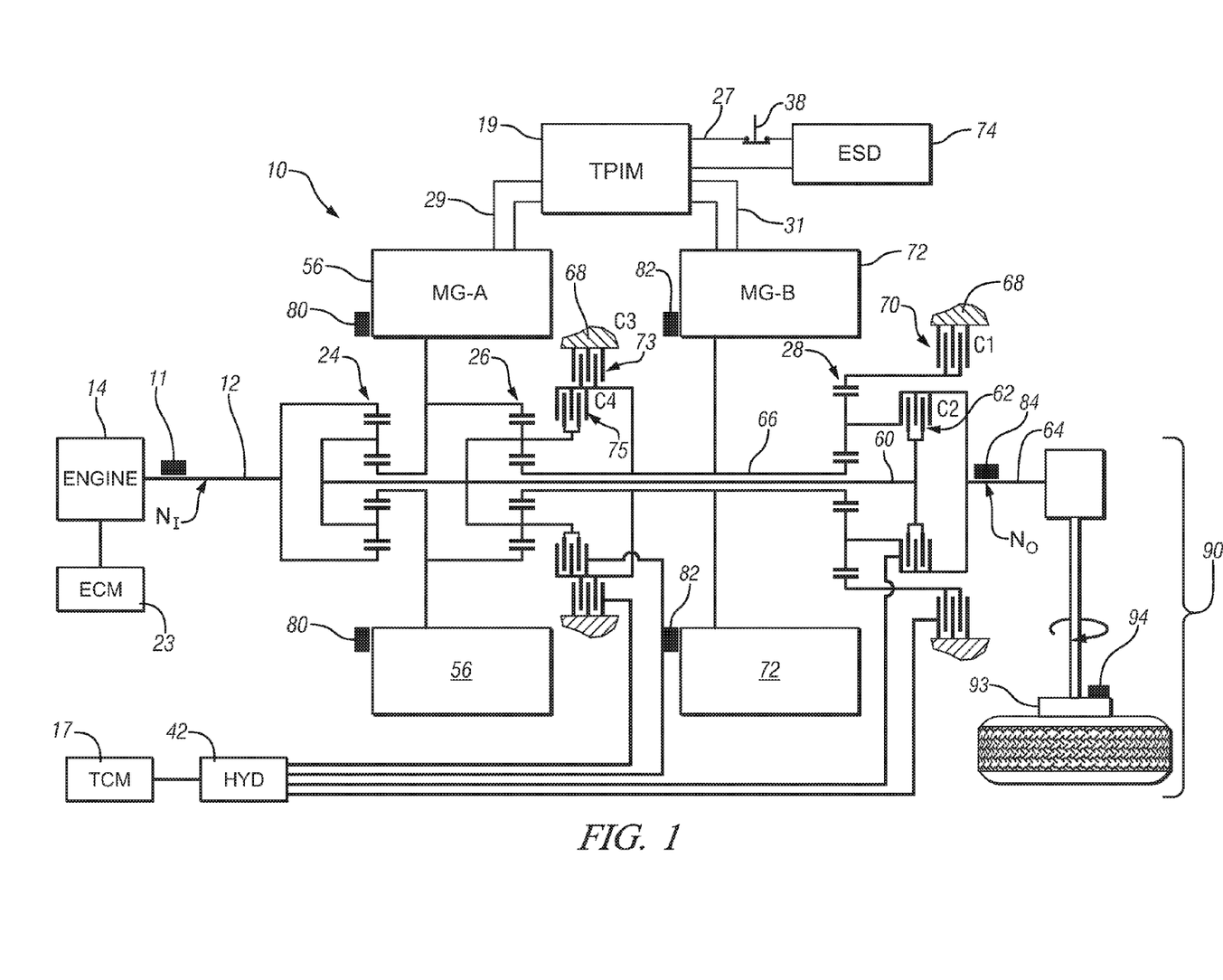
FIG. 1 is a schematic diagram of an exemplary powertrain, in accordance with the present disclosure.
Figure 2:
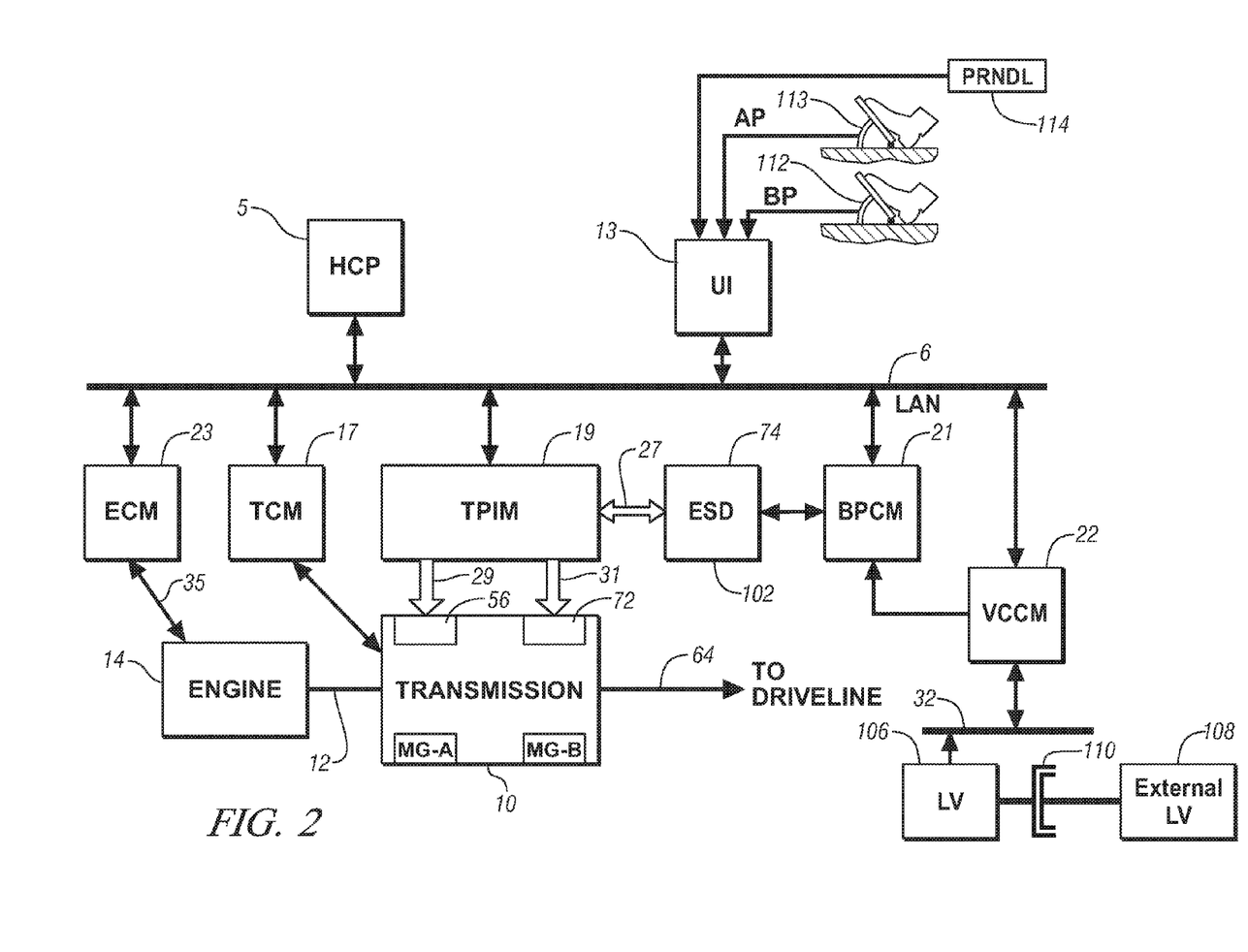
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electromechanical hybrid powertrain in accordance with the present disclosure is depicted in FIG. 1, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35.

The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

A power supply subsystem of the distributed control module system includes the ESD 74 (including a high voltage battery 102), the BPCM 21, the ECDM 23, the HCP 5, a voltage conversion control module (hereafter, 'VCCM') 22, a low voltage bus 32, a low voltage battery 106.

In one embodiment, the high voltage battery 102 is nominally in the range of 300 V and the high voltage battery 102 includes several cell modules (not shown). In one embodiment, each cell module includes several individual battery cells (not shown). The high voltage battery 102 transfers energy to and receives energy from electric machine 56 and 72 through the inverters of the TPIM 19.

The BPCM 21 is signally connected to sensors (not shown) to monitor the high voltage battery 102, including states of electrical current and voltage parameters, to provide information indicative of parametric states of the high voltage battery 102 to the HCP 5. The parametric states of the battery preferably include battery state-of-charge, battery voltage, cell module temperature, and available battery power, referred to as a range $P_{BAT\_MIN}$ to $P_{BAT\_MAX}$. Cell module temperature is measured utilizing sensors at the cell modules of the high voltage battery 102.

The low voltage bus 32 supplies energy to low voltage components of the vehicle including vehicle accessories, for example, electronic actuators (not shown) utilized in power windows and door locks, a climate control system (not shown) and an audio system (not shown) of the vehicle. Further, the low voltage bus 32 is electrically connected to each of the control modules i.e., HCP 5, ECM 23, TCM 17, TPIM 19, and BPCM 21, and other control modules to provide low voltage power for operation of the control modules and other vehicle and powertrain devices. The low voltage bus is maintained at a nominal voltage of between 12 V and 14 V. The low voltage battery 106 and the VCCM 22 maintain the voltage across the low voltage bus 32.

The VCCM 22 is electrically coupled to the high voltage battery 102 and the low voltage battery 106. The VCCM 22 monitors the voltage levels of the high voltage battery 102 and the low voltage bus 32 and controls voltage levels of the high voltage battery 102 and the low voltage bus 32 by providing voltage conversion between the high voltage battery 102 and the low voltage bus 32. Further, the VCCM 22 monitors and provides voltage conversion from the high voltage battery 102 to an intermediate voltage bus (not shown).

A virtual network (not shown) allows for structured communication of states of operating parameters and actuator command signals between primary control modules when the vehicle is in an energy conservation mode. The energy conservation mode is a powertrain operating mode in which selected control modules and components are shutdown to conserve energy. In one embodiment, the virtual network utilizes architecture of the LAN 6 to route communication between primary vehicle components including the BPCM 21, the VCCM 22, the HCP 5, and the ECM 23, when the powertrain is receiving power from an external power source 108.

The external power source 108 provides low voltage power nominally in the range of 12 V-14 V to charge the low voltage battery 106. The external power source 108 includes connection cables 110 that are configured to detachably electrically couple the external power source 108 to the positive and negative terminals of the low voltage battery 106.

In one embodiment, the external power source 108 is a portable battery charger. In an alternative embodiment, the external power source 108 is a battery or generator supplied by another vehicle. In other alternative embodiments, the external power source 108 can be connected at other locations of the powertrain that are in electrical communication with the low voltage battery 106 to transfer energy to the low voltage battery 106.

Figure 3:
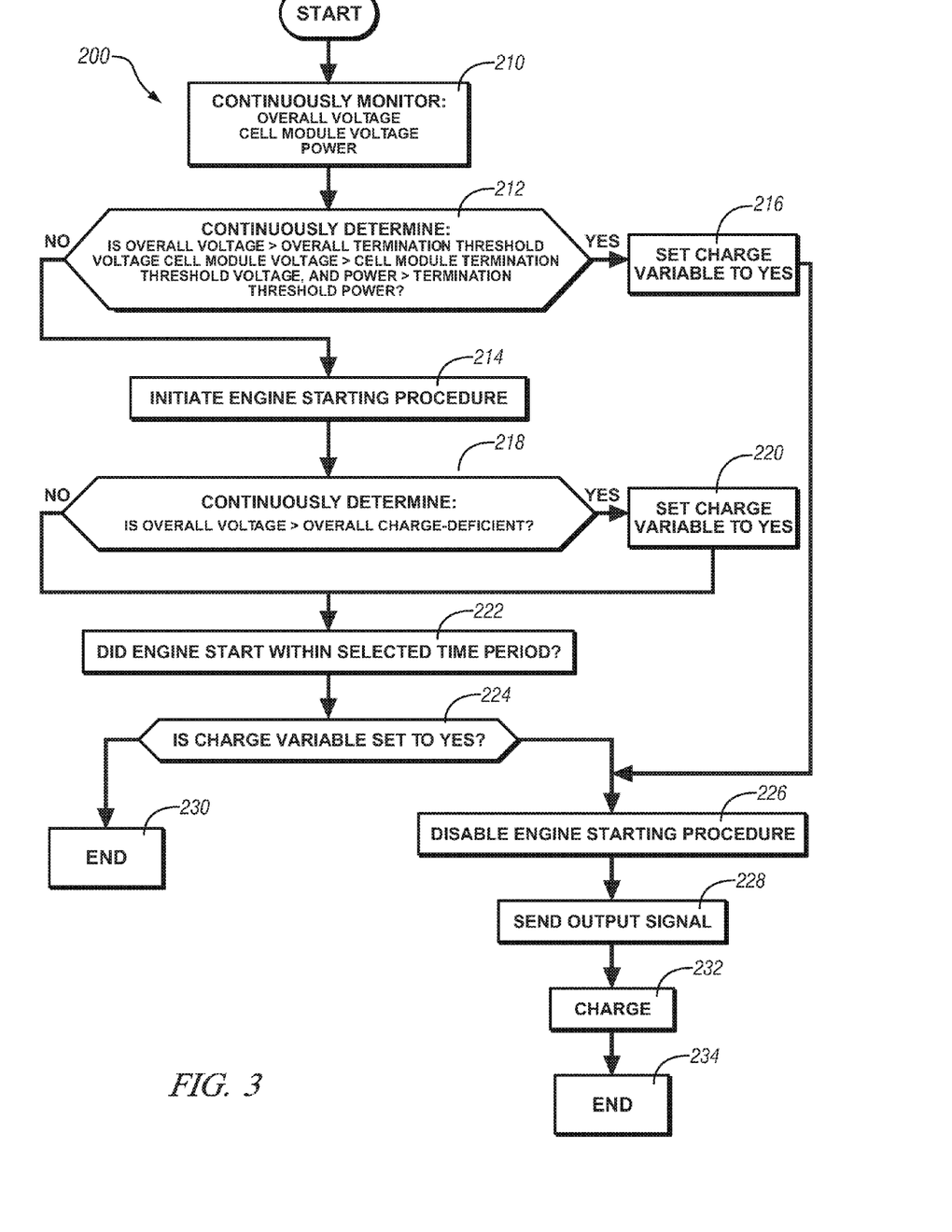
FIG. 3 is a flow chart diagram of a method of externally charging a hybrid electric vehicle, in accordance with the present disclosure.

Referring to FIG. 3, a method 200 for externally charging the powertrain is shown. The method is control by the BPCM 21, the VCCM 22, and the HCP 5.

The HCP 5 makes decision based on whether voltages and power levels measured in the high voltage battery 102 are below threshold values. In particular, when executing the method 200, the HCP 5 makes decisions by comparing each voltage level measurement and each power level measurement to either a "termination" threshold or a "charge-deficient" threshold.

As used herein, the term "termination" threshold refers to a level of voltage or of power of the high voltage battery 102 at which it is undesirable to run an engine starting procedure, and thus the engine starting procedure is terminated. The term "charge-deficient threshold" refers to a level of charge of the high voltage battery 102 that is less than a nominal voltage level, but above the termination threshold voltage. If the measured voltage or power level is below the charge-deficient threshold, but above the termination threshold, the engine start procedure will not be terminated unless the engine start procedure fails to start the engine 14 after a selected period of time.

The HCP 5 continuously receives signals from BPCM 21 via the virtual network to continuously monitor overall voltage level, cell module voltage levels, and power capability level of the high voltage battery 102 (210). The BPCM 21 utilizes the voltage measurement along with values measured by the sensors of the high voltage battery 102 to continuously determine a power capability level, that is, a power level that the high voltage battery 102 is currently able to deliver. In one embodiment, the BPCM 21 determines the power capability level of the high voltage battery 102 by calculating a battery state of charge based on cell module voltage levels, cell module temperature measurements, and a high voltage battery 102 current level.

The HCP 5 continuously monitors overall voltage level, cell module voltage levels, and power capability level throughout the method 200 and in particular, prior to and throughout the step 214 of the method 200.

The HCP 5 decides whether to proceed to either to step 216 or to step 218 based the measurements of step 210 (212). In particular, the measurements of step 210 are processed utilizing a filtering process and decisions are made utilizing an average of sample measurements over time. If the HCP 5 determines the overall voltage is greater than an overall termination threshold voltage, each cell module voltage is greater than a cell module termination threshold voltage, and the power capability level is greater than a termination threshold power the HCP 5 proceeds to step 214.

The overall termination threshold voltage is an overall high voltage battery voltage level at which it is undesirable to perform the engine starting procedure. In one exemplary embodiment, the overall termination threshold voltage is fifty percent of the nominal voltage of the high voltage battery 102. In one embodiment, the high voltage battery 102 is nominally 300 V and the overall termination threshold voltage is 150 V.

The cell module termination threshold voltage is a voltage level of any of the cell modules of the high voltage battery 102 at which it is undesirable to perform the engine starting procedure. In one exemplary embodiment, the cell module termination threshold voltage is about fifty percent of the nominal voltage of the cell modules.

The termination threshold power is a power capability level of the battery 102 at which it is undesirable to perform the engine starting procedure.

If each of the overall voltage, cell module voltage, and power capability level are greater than the overall termination threshold voltage, the cell termination threshold voltage, and the termination threshold power, respectively, then the control system proceeds to step 216, if not, then the control system proceeds to step 218.

The HCP 5 continuously determines whether power and voltage levels are above threshold power and voltage levels throughout the engine starting procedure. Thus, if at any time during the engine starting procedure any of the individual cell voltage, the overall battery voltage, or the power capability level falls under its respective termination threshold value, then the engine starting procedure discontinues and the control system advances to step 216.

The powertrain performs the engine starting procedure (214). The engine starting procedure is commonly known as "cranking." In one embodiment, a user initiates the engine staring procedure by turning a key (not shown) to an "on" position. In one embodiment, the user initiates the engine starting procedure by pushing a button (not shown). When the user initiates the engine starting procedure, the high voltage battery 102 provides electrical current to the electrical machines 56 and 72 to provide motor assisted startup to the engine 14.

The engine starting procedure is performed for a selected period of time corresponding to a time at which the engine 14 would start under normal operating conditions. In one exemplary embodiment, the engine starting procedure is performed either until the engine 14 is operating or until three seconds of time elapses.

The HCP 5 sets a "charge variable" to YES (216). The charge variable equal to "YES" is indicative of a charge deficiency in the high voltage battery 102.

The HCP 5 decides whether to proceed to either step 220 or step 222 based a voltage measurement of step 210. The HCP 5 determines whether the overall voltage of the high voltage battery 102 is greater than an overall charge-deficient threshold voltage. If the overall voltage of the high voltage battery 102 is greater than the overall charge deficient threshold voltage, then the HCP 5 proceeds to step 230, if not then the control system proceeds to step 220.

In alternate exemplary embodiments the HCP 5 can determine whether each cell module voltage is greater than a cell module charge-deficient threshold voltage, and whether the power capability level is greater than a termination threshold power level in addition to or instead of determining whether the overall voltage is greater than an overall charge-deficient threshold voltage.

The overall charge-deficient threshold voltage is an overall high voltage battery 102 voltage level at which the engine 14 may not start due to low overall battery voltage. In one embodiment, the overall charge-deficient threshold voltage is a voltage level between the overall termination threshold voltage and the nominal voltage level of the battery.

The cell module charge-deficient threshold voltage is a voltage level of any of the cell modules of the high voltage battery 102 at which the engine 14 may not start due to low cell module voltage of one of the cell modules of the high voltage battery 102. In one embodiment, the overall charge-deficient cell module voltage is a voltage level between the cell module termination threshold voltage and the nominal voltage of the cell modules of the high voltage battery.

The charge-deficient threshold power is a power capability level of the high voltage battery 102 at which the engine 14 may not start due to low battery power available from the high voltage battery 102. In one embodiment, the overall charge-deficient threshold power is a power capability level between termination threshold power level and the nominal power capability level of the high voltage battery 102.

In an alternative exemplary embodiment, if each of the overall voltage, cell module voltages, and power capability of are greater than the overall charge-deficient threshold voltage, cell charge-deficient threshold voltage, and the charge-deficient threshold power, then the control system proceeds to step 230, if not then the control system proceeds to step 220.

The charge variable is set to 'YES' (220). The charge variable equal to "YES" is indicative of a charge deficiency in the high voltage battery 102. After step 220, the control system proceeds to step 222.

The HCP 5 determines whether the engine 14 started within a selected time period (222). The selected time period is a time period within which the engine 14 provides self propulsion during normal operating conditions. In one embodiment, the selected time period is three seconds. If the HCP 5 determines the engine 14 started within the selected time period, then the method advances to step 230. If not, the method advances to step 224.

The HCP 5 determines whether the charge variable is set to YES (224). If the charge variable is set to YES, then the monitored overall voltage, had a value below its charge-deficient threshold sometime during the engine starting procedure 212. If the charge variable is set to YES, the HCP 5 advances to step 226. If the charge variable is not set to YES, the HCP 5 advances to step 230.

The HCP 5 discontinues the method 200 without determining an insufficient charge level associated with the high voltage battery 102 (230).

When the HCP 5 proceeds to steps 226, 228, and 230, the HCP 5 determined an insufficient charge level associated with the high voltage battery 102.

The control system sets a variable to disable the starting procedure (226), thereby not allowing further starting of the vehicle until the variable is reset.

The HCP 5 sends output signals to other control units of the hybrid electric vehicle (228). Further, the HCP 5 sends a signal to a visual display (not shown), thereby notifying a vehicle operator to externally charge the powertrain.

The low voltage battery 106 is charged by the external low voltage power source 108 (232). In particular, the connection cables 110 of the external power source 108 are connected to terminals (not shown) of the low voltage battery 106. As the external power source 108, transfers charge to the low voltage battery 106, the low voltage battery 106 transfers charge to the high voltage battery 102 through the VCCM 22.

The low voltage battery 106 is being charged while each of the auxiliary control processors and each of the auxiliary vehicle components is turned off such that power is conserved for battery charging. Charge is transferred from the external power source 108 until a voltage of the high voltage battery 102 is above a charging threshold and until a selected level of power is transferred from the external power source 108. The selected level of power is measured by the BPCM 21 by integrating the current transferred from the external low voltage power source over time. After the step 232, the HCP 5 proceeds to end step 234.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method of externally charging a powertrain comprising:
   monitoring a voltage level of a first battery;
   comparing the monitored voltage level to first and second voltage thresholds, the first voltage threshold having a higher voltage than the second voltage threshold, wherein the first voltage threshold comprises an overall voltage of the first battery at which the engine may not start due to low overall battery voltage and the second voltage threshold comprises a voltage of the first battery at which it is undesirable to initiate an engine start procedure;
   when the monitored voltage is at least the second voltage threshold,
      initiating an engine starting procedure, and
      terminating the engine start procedure when both the monitored voltage level is below the first voltage threshold and an engine does not start during the engine starting procedure; and
   when the monitored voltage level is below the second voltage threshold, charging the first battery by supplying power from an external power source and increasing voltage of the power supplied by the external power source within the powertrain.

2. The method of claim 1, wherein monitoring the voltage level of the first battery comprises monitoring an overall voltage level of the first battery and wherein the method further comprises sending an output signal when the overall voltage level of the first battery is below a first overall voltage threshold.

3. The method of claim 1, wherein monitoring the voltage level of the first battery comprises monitoring a cell module voltage of the first battery and wherein the method further comprises sending an output signal when the cell module voltage is below a first cell module voltage threshold.

4. The method of claim 1, wherein monitoring the voltage level of the first battery includes both monitoring an overall voltage level of the first battery and a cell module voltage of the first battery, and wherein the method further comprises sending an output signal when at least one of the overall voltage level is below a first overall voltage threshold and the cell module voltage is below a first cell module voltage threshold.

5. The method of claim 1 further comprising:
   monitoring a power level of the first battery;
   determining when the power level is below a first power threshold; and
   when the power level is below the first power threshold, sending an output signal.

6. The method of claim 5 further comprising utilizing a temperature level measurement and the monitored voltage level to monitor the power level of the first battery.

7. The method of claim 5 further comprising:
   determining a state of charge of the first battery based on the monitored voltage level; and
   determining the power level of the first battery based on the state of charge of the first battery.

8. A method of externally charging a powertrain comprising:
   monitoring a voltage level of a first battery;
   comparing the monitored voltage level to first and second voltage thresholds, the first voltage threshold having a higher voltage than the second voltage threshold;
   when the monitored voltage is at least the second voltage threshold,
      performing an engine starting procedure, and
      terminating the engine start procedure when both the monitored voltage level is below the first voltage threshold and an engine does not start during the engine starting procedure, wherein the engine starting procedure is performed for a selected time period and the output signal is sent when the engine does not start within the selected time period; and when the monitored voltage level is below the second voltage threshold, charging the first battery by supplying power from an external power source and increasing voltage of the power supplied by the external power source within the powertrain.

9. The method of claim 1 wherein terminating the engine start procedure further comprises:
sending the output signal when the monitored voltage level is below the first voltage threshold.

10. The method of claim 1 wherein performing the engine start procedure further comprises:
sending an output signal when both the monitored voltage level is below the first voltage threshold and the engine does not start during the engine starting procedure; and
terminating the engine starting procedure and sending the output signal when the voltage level is below the first voltage threshold.

11. The method of claim 1, wherein power is supplied from the external power source until a selected period of time elapses.

12. The method of claim 1, further comprising sending an output signal to a visual display when the voltage level is below the first voltage threshold.

13. The method of claim 1, wherein the external power source is electrically coupled to terminals of a second battery, said second battery having a lower voltage then the first battery.

14. The method of claim 1, wherein the external power source is an external battery.

15. The method of claim 1 further comprising sending an output signal to a vehicle user, wherein the output signal induces a visual signal.

16. A method of externally charging a powertrain comprising:
monitoring a voltage level of a first battery;
comparing the monitored voltage level to first and second voltage thresholds, the first voltage threshold having a higher voltage than the second voltage threshold, wherein the first voltage threshold comprises an overall voltage of the first battery at which the engine may not start due to low overall battery voltage and the second voltage threshold comprises a voltage of the first battery at which it is undesirable to initiate an engine start procedure; and
when the monitored voltage is at least the second voltage threshold,
initiating an engine starting procedure,
sending an output signal to a vehicle user when both the engine starting procedure fails and when the monitored voltage level is below the first voltage threshold in the first battery, and
transferring charge from an external power source to a second battery when the output signal is sent.

17. The method of claim 16, wherein the second battery has a lower voltage level than the first battery.

18. A method of externally charging a powertrain comprising:
monitoring a power level of a first battery;
comparing the monitored power level to first and second power thresholds, the first power threshold having a higher power than the second power threshold, wherein the first power threshold comprises an overall power of the first battery at which the engine may not start due to low overall battery power and the second power threshold comprises a power of the first battery at which it is undesirable to initiate an engine start procedure; and
when the monitored power is at least the second power threshold,
initiating an engine starting procedure,
sending an output signal to a vehicle user when both the engine starting procedure fails and when the monitored power level is below the first power threshold in the first battery, and
transferring charge from an external power source to a second battery when the output signal is sent.

19. The method of claim 18, wherein the power is measured based on a voltage measurement and a temperature measurement.

* * * * *